(12) United States Patent
Zhiltsov

(10) Patent No.: US 11,487,991 B2
(45) Date of Patent: Nov. 1, 2022

(54) CLASSIFYING BUSINESS SUMMARIES AGAINST A HIERARCHICAL INDUSTRY CLASSIFICATION STRUCTURE USING SUPERVISED MACHINE LEARNING

(71) Applicant: The Dun & Bradstreet Corporation, Short Hills, NJ (US)

(72) Inventor: Nikita Zhiltsov, Sunnyvale, CA (US)

(73) Assignee: THE DUN AND BRADSTREET CORPORATION, Short Hills, NJ (US)

( * ) Notice: Subject to any disclaimer, the term of this patent is extended or adjusted under 35 U.S.C. 154(b) by 660 days.

(21) Appl. No.: 16/559,963

(22) Filed: Sep. 4, 2019

(65) Prior Publication Data
US 2021/0064956 A1 Mar. 4, 2021

(51) Int. Cl.
*G06N 3/04* (2006.01)
*G06F 17/16* (2006.01)
(Continued)

(52) U.S. Cl.
CPC .............. *G06N 3/04* (2013.01); *G06F 17/16* (2013.01); *G06F 17/18* (2013.01); *G06K 9/628* (2013.01)

(58) Field of Classification Search
CPC .......... G06N 3/04; G06N 3/0481; G06N 3/08; G06F 17/16; G06F 17/18; G06F 40/279;
(Continued)

(56) References Cited
U.S. PATENT DOCUMENTS
2004/0111453 A1  6/2004 Harris et al.
2008/0140648 A1  6/2008 Song et al.
(Continued)

FOREIGN PATENT DOCUMENTS
CA      2528887 C * 8/2012 ....... G06F 17/30672

OTHER PUBLICATIONS
International Preliminary Report on Patentability dated Mar. 8, 2022 in corresponding PCT International Patent Application PCT/US2020/049158; 6 pgs.
(Continued)

*Primary Examiner* — Tan V Mai
(74) *Attorney, Agent, or Firm* — Ohlandt, Greeley, Ruggiero and Perle, LLP

(57) ABSTRACT

A classification system is provided for classifying text-based business summaries, referred to herein as "summaries," against a hierarchical industry classification structure. The classification system includes a word-based sub classifier that uses a neural network to generate a vector space for each summary in a training set, where each summary in the training set is known to correspond to a particular industry classification in the hierarchical industry classification structure. Weight values in the hidden layer of a neural network used by the word-based sub classifier are changed to improve the predictive capabilities of the neural network in the business summary classification context. Embodiments include increasing representation in the training set for underrepresented parent industry classifications and attributes of the hierarchical industry classification structure, such as distances between industry classifications and whether industry classifications are in the same subgraph. The completion of training of the word-based sub classifier is based upon whether a performance metric, such as an $hF_1$ score, satisfies one or more early stopping criteria. The classification system also includes a category-based sub classifier and a meta classifier.

21 Claims, 7 Drawing Sheets

(51) Int. Cl.
 *G06F 17/18* (2006.01)
 *G06K 9/62* (2022.01)
(58) Field of Classification Search
 CPC ........ G06F 40/30; G06K 9/628; G06K 9/627; G06K 9/6262; G06K 9/6282; G06V 10/82
 USPC .......................................................... 706/15
 See application file for complete search history.

(56) References Cited

U.S. PATENT DOCUMENTS

| | | |
|---|---|---|
| 2009/0106223 A1 | 4/2009 | Meyerzon et al. |
| 2014/0067735 A1 | 3/2014 | Yu et al. |
| 2014/0289675 A1 | 9/2014 | Stading et al. |
| 2015/0073792 A1 | 3/2015 | Riccardi |
| 2016/0125025 A1* | 5/2016 | Blanco ................ G06F 3/04842 707/772 |

OTHER PUBLICATIONS

International Search Report dated Jan. 21, 2021 in corresponding PCT International Patent Application PCT/US2020/049158, 2 pgs.
Written Opinion dated Jan. 21, 2021 in corresponding PCT International Patent Application PCT/US2020/049158, 5 pgs.

* cited by examiner

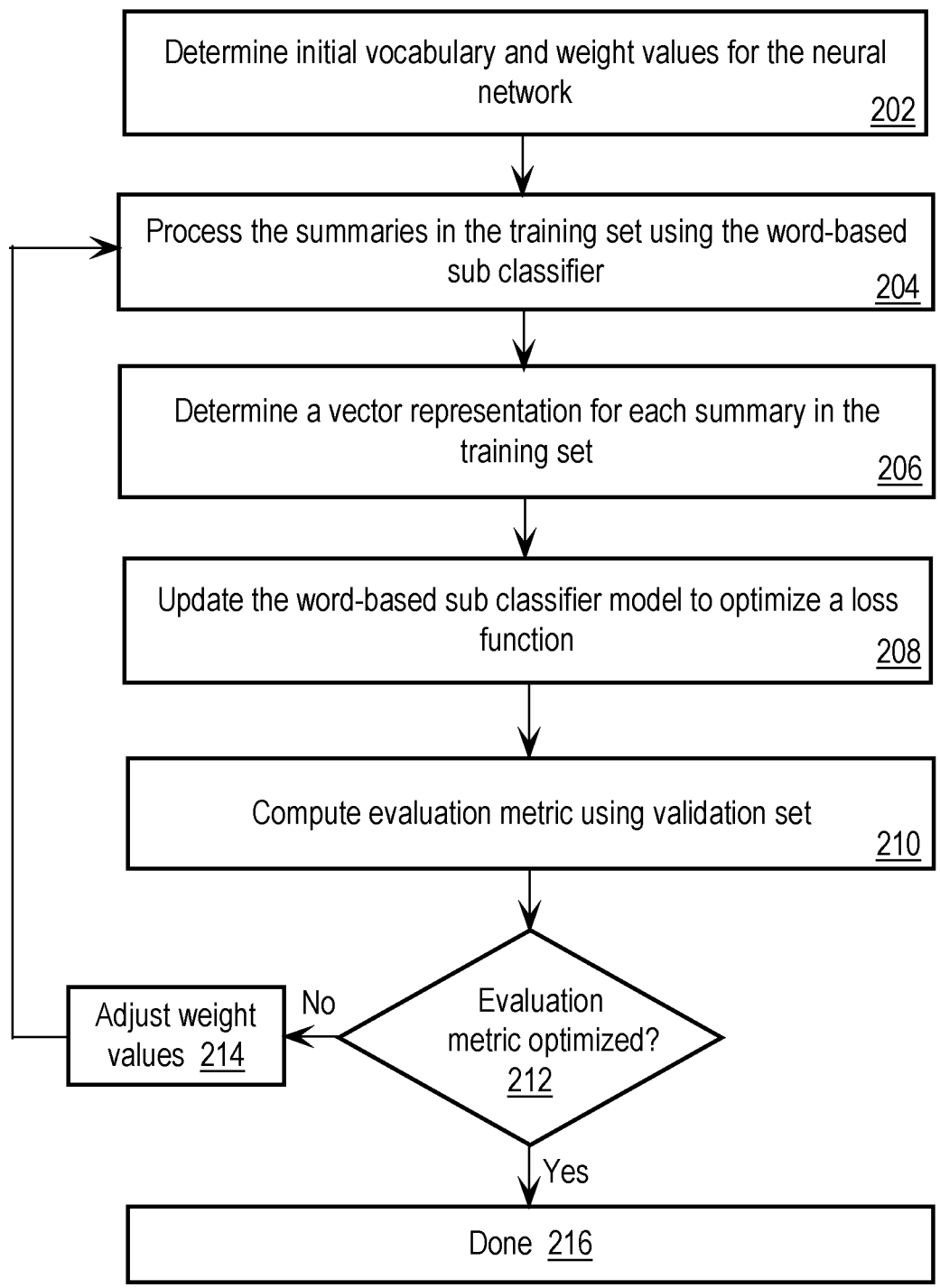

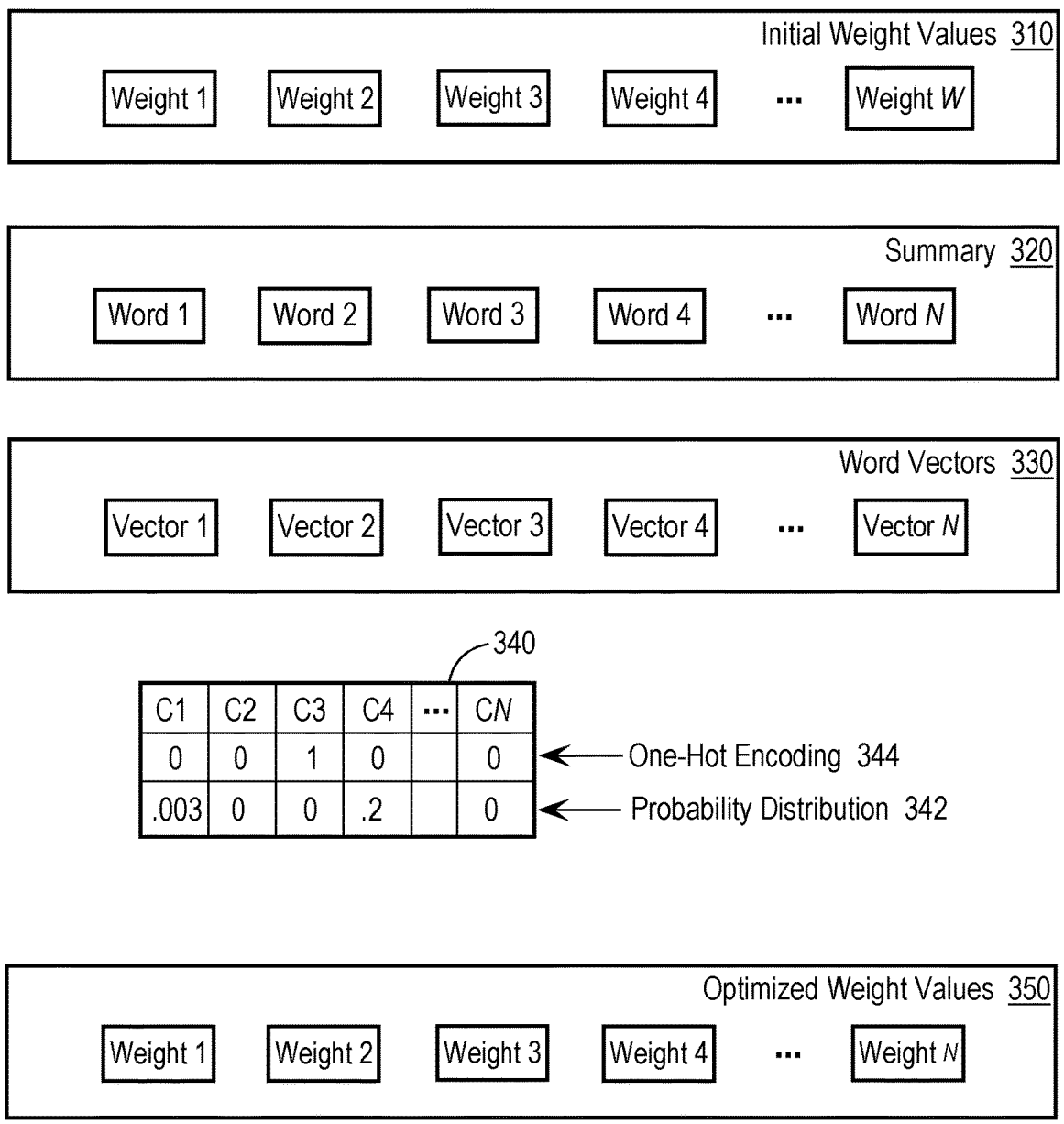

FIG. 3B
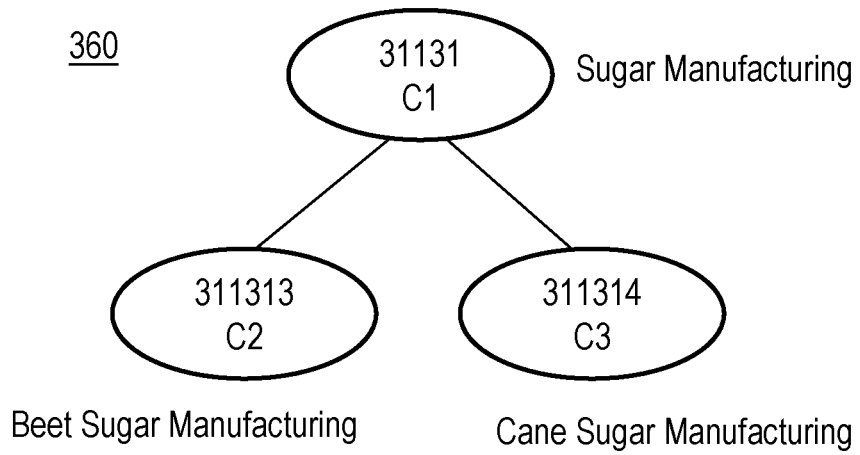
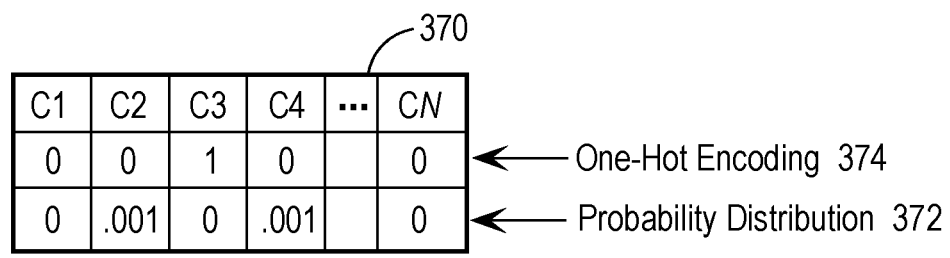
FIG. 3C
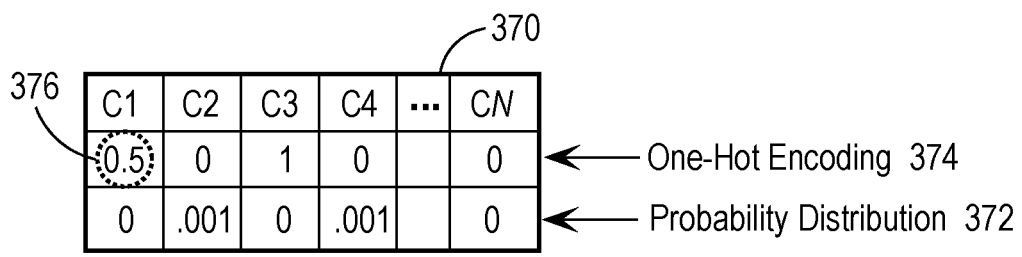

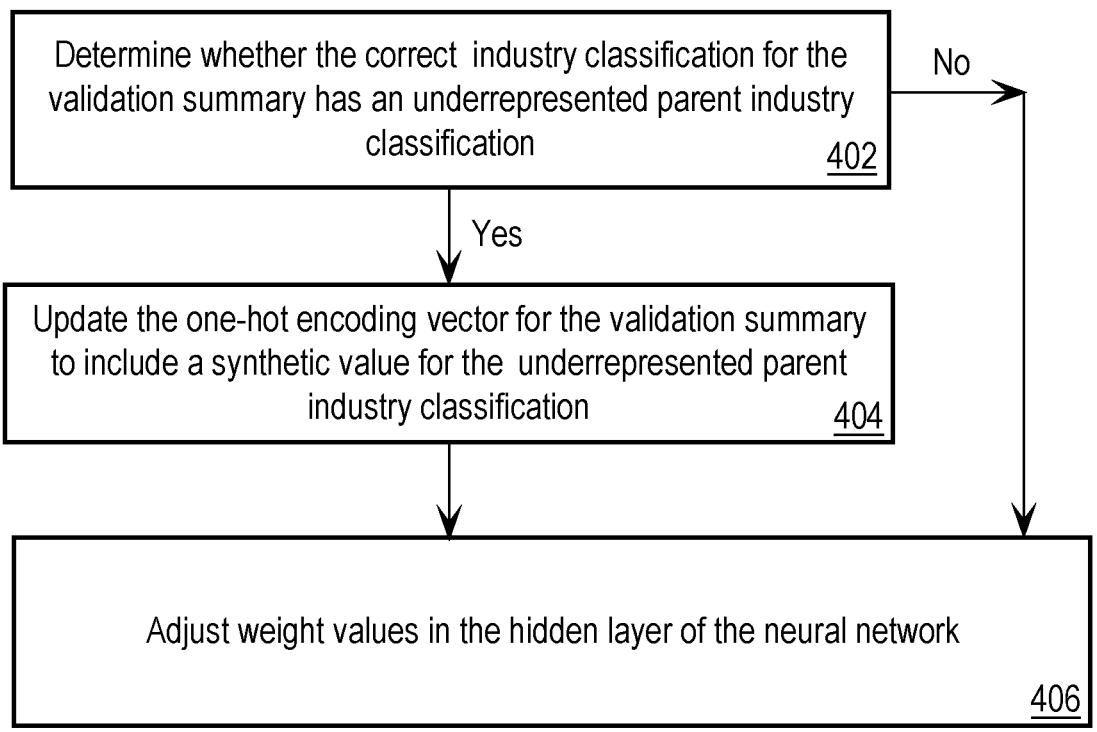

```
┌─────────────────────────────────────────────────────────────────┐
│ Receive a request to classify a business summary against a     │
│ hierarchical industry classification system                     │
│                                                             502 │
└─────────────────────────────────────────────────────────────────┘
                                  ↓
┌─────────────────────────────────────────────────────────────────┐
│ Determine a mathematical representation, in the form of a       │
│ vector, of the business summary                                 │
│                                                             504 │
└─────────────────────────────────────────────────────────────────┘
                                  ↓
┌─────────────────────────────────────────────────────────────────┐
│ Calculate a word-based probability distribution over industry   │
│ classifications for the given business summary vector, using    │
│ the word-based sub classifier                                   │
│                                                             506 │
└─────────────────────────────────────────────────────────────────┘
                                  ↓
┌─────────────────────────────────────────────────────────────────┐
│ Calculate a category-based probability distribution over        │
│ industry classifications for the given business summary vector, │
│ using the category-based sub classifier                         │
│                                                             508 │
└─────────────────────────────────────────────────────────────────┘
                                  ↓
┌─────────────────────────────────────────────────────────────────┐
│ Generate a predicted probability distribution based upon the    │
│ probability distributions generated by the word-based sub       │
│ classifier and the category-based sub classifier                │
│                                                             510 │
└─────────────────────────────────────────────────────────────────┘
                                  ↓
┌─────────────────────────────────────────────────────────────────┐
│ Provide the industry classifications with the highest           │
│ probabilities in the predicted probability distribution as      │
│ predicted classifications for the business summary              │
│                                                             512 │
└─────────────────────────────────────────────────────────────────┘
```

CLASSIFYING BUSINESS SUMMARIES AGAINST A HIERARCHICAL INDUSTRY CLASSIFICATION STRUCTURE USING SUPERVISED MACHINE LEARNING

FIELD

The technical field of this application relates to computer-implemented classification of business information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Business profile data specifies information about business entities and typically includes the name and address of a business, a description of the business, a physical location and Website of the business, names and positions of key employees, the number of employees, financial information, and one or more industry classifications for the business. Business profile data is used by third parties for a variety of reasons, for example, to perform digital marketing, sales predictions, lead scoring, intent/needs prediction, etc.

One of the issues with business profile data is that it often contains incomplete and/or unreliable data. For example, the business profile for a particular business entity may be missing certain information or worse, include incorrect information. The missing or incorrect information may be attributable to human error in creating the business profiles, outdated data, etc. One important type of business profile data is the industry classification. Businesses use industry classifications to identify customers, for marketing, and for interacting with government entities. Governments use industry classifications for auditing, legislative purposes, and to facilitate the administration of the Internal Revenue Code.

Assigning industry classifications to business entities has conventionally been performed manually, which is very labor intensive and subject to error. Attempts to automate the process of classifying business entities suffer from inaccuracies attributable to the "extreme classification" problem caused by a large number of business classifications. For example, the North American Industry Classification System (NAICS) has over two thousand industry classifications and the Standard Industrial Classification (SIC) has over one thousand five hundred industry classifications. Also, imbalances in the amount of data between industry classifications and the difficulty in incorporating errors into predictions, given the hierarchical nature of industry classification structures, contribute to inaccuracies in the models used by automated systems.

BRIEF DESCRIPTION OF THE DRAWINGS

Embodiments are depicted by way of example, and not by way of limitation, in the figures of the accompanying drawings and in which like reference numerals refer to similar elements.

FIG. 2 is a flow diagram that depicts an approach for training a word-based sub classifier using a loss function and a performance metric.

FIG. 3A is a block diagram that depicts data structures used in generating a mathematical representation, in the form of a vector, for a particular summary.

FIG. 3B is a block diagram that depicts a portion of a hierarchical industry classification structure that includes a parent industry classification and two child industry classifications.

FIG. 3C is block diagram that depicts a modified one-hot encoding of the true class distribution, incorporating relationships between a child industry code and its immediate parent in the hierarchy.

FIG. 4 is a flow diagram that depicts an approach for increasing the representation of underrepresented parent industry classifications according to an embodiment.

FIG. 5 is a flow diagram that depicts an approach for classifying text-based descriptions of business entities against a hierarchical industry classification structure.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Classification Architecture
III. Training and Validation Sets
   A. Summaries
   B. Classifications
   C. Vectors
IV. Training the Neural Network
V. Special Considerations for Underrepresented Parent Industry Classifications
VI. Performance Evaluation
VII. Using the Classification System to Classify Business Summaries
VIII. Implementation Examples

I. Overview

A classification system is provided for classifying text-based business summaries, referred to herein as "summaries," against a hierarchical industry classification structure. The classification system includes a word-based sub classifier that uses a neural network to generate a vector space for each summary in a training set, where each summary in the training set is known to correspond to a particular industry classification in the hierarchical industry classification structure. Weight values in the hidden layer of a neural network used by the word-based sub classifier are changed to improve the predictive capabilities of the neural network in the business summary classification context. Embodiments include increasing representation in the training set for underrepresented parent industry classifications and attributes of the hierarchical industry classification structure, such as distances between industry classifications and whether industry classifications are in the same subgraph. The completion of training of the word-based sub classifier is based upon whether a performance metric, such as an $hF_1$ score, satisfies one or more early stopping criteria. The classification system also includes a category-based sub classifier and a meta classifier. The system combines the benefits of a word-based sub classifier in the form of better word coverage and generalization through associative relationships between words with the benefits of a category-based sub classifier in the form of specific phrases that are known to be important and that occur in text-based business summaries.

II. Classification Architecture

Figure 1:
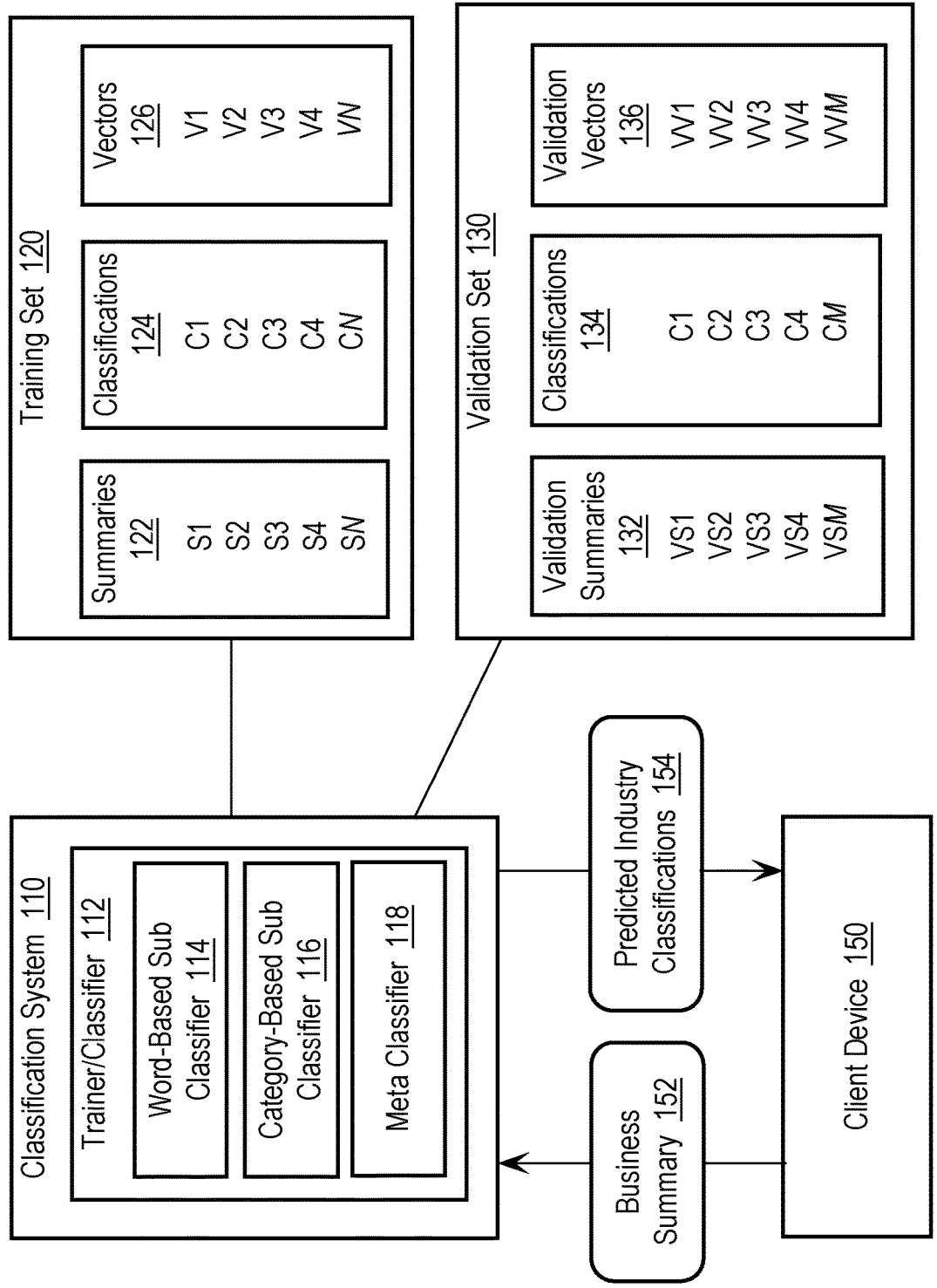
FIG. 1 is a block diagram that depicts a classification arrangement that includes a classification system, a training set, a validation set, and a client device.

FIG. 1 is a block diagram that depicts a classification arrangement 100 that includes a classification system 110, training set 120, a validation set 130, and a client device 150. The various elements of FIG. 1 may be implemented on one or more computing systems and communicate via one or more wired and/or wireless communications links, such as wired and wireless networks.

The classification system 110 may be implemented by one or more computing devices and may include other elements that are not depicted in FIG. 1 and described herein for purposes of brevity. For example, the classification system 110 may include one or more processors, volatile and/or non-volatile memories and storage, communications interfaces, an operating system, one or more processes, etc. The classification system 110 includes a trainer/classifier 112 that is configured to perform the training and classification functionality described herein. The trainer/classifier 112 may be implemented by one or more computer-implemented processes executing on the classification system 110. The trainer/classifier 112 is depicted in the figures and described herein as a separate element for explanation purposes only, and the functionality of trainer/classifier 112 may be implemented as a stand-alone element and/or integrated into another element. The trainer/classifier 112 may implement one or more application program interfaces to provide access to functionality provided by trainer/classifier 112, for example, by client device 150.

According to an embodiment, the trainer/classifier 112 is configured with two sub-classifiers that include a word-based sub classifier 114, such as a word2vec classifier, and a category-based sub classifier 116, and a meta classifier 118. The word-based sub classifier 114 uses a neural network to generate a vector space for each summary in the training set 120. Weight values used by a hidden layer of the neural network are optimized to improve the predictive capabilities of the neural network in the business summary classification context, as described in more detail hereinafter.

The category-based sub classifier 116 works with the different vector representation of a text-based business summary. When classifying a given summary, the category-based sub classifier 116 extracts, from the summary, key phrases from a pre-defined dictionary of categories. Example categories include, without limitation, "marketing automation," "Internet of things," "revenue performance management," and "lead management software." Then, the category-based sub classifier 116 generates a vector for the summary that is a Term Frequency (TF)-Inverse Document Frequency (IDF) weighted vector of the pre-defined categories appearing in the summary. As used herein, the TF refers to the frequency of the pre-defined category in the summary and the term IDF refers to the inverse frequency of the pre-defined category in a database of text-based business summaries. The use of IDF reduces the influence of broad pre-define categories and increases the influence of more specific pre-defined categories. Each vector component for the summary has a weight of TF*IDF. The vector dimension size is equal to the number of pre-defined categories, and may be close to 20,000. Unlike word2vec vectors, the vectors of the pre-defined categories are very sparse.

According to an embodiment, the category-based sub classifier 116 uses a multi-layer neural network that takes these vectors as an input and outputs the probability distribution over the industry classifications in the hierarchical industry classification structure. The architecture of this multi-layer neural network may include several layers of fully-connected dense layers with ReLu activation, batch normalization layers, dropout layers, and a softmax layer as an output layer. The multi-layer neural network is trained in a similar manner to the neural network used by the word-based sub classifier 114.

The meta-classifier 118 is a computation module that takes as inputs the predicted industry class probabilities from the word-based sub classifier 114 and the category-based sub classifier 116, and computes the geometric mean of these class probability vectors, i.e., by averaging the industry classification predictions generated by the word-based sub classifier 114 and the category-based sub classifier 116. The meta-classifier 118 may also calculate a weighted geometric mean of the industry classification predictions generated by the word-based sub classifier 114 and the category-based sub classifier 116. The weighted geometric mean may apply weights based upon parameters configured for the meta-classifier 118. For example, the parameters for the meta-classifier 118 may be tuned on the validation set 130 so that the industry class probabilities from the word-based sub classifier 114 are given more importance (e.g. =2) than the industry class probabilities from the category-based sub classifier 116 (e.g. =1). In this case, the meta-classifier 118 computes the weighted geometric mean.

Client device 150 is a computing device configured to communicate with classification system 110, for example via one or more computing networks and/or direct communications links, such as wired and wireless communications links. Examples of client device 150 include, without limitation, a workstation, a desktop computer, a laptop computer, a notebook computer, a tablet computing device, and any type of portable/mobile computing device, such as a personal digital assistant, a smartphone, etc.

III. Training and Validation Sets

Classification arrangement 100 includes two types of training data that include a training set 120 and a validation set 130. The training set 120 includes text-based business summaries ("summaries") 122, classifications 124, and vectors 126. Each text-based business summary 122 has a corresponding classification 124 and vector 126. Trainer/classifier 112 uses the vectors 126 to classify business summaries against a hierarchical industry classification structure, such as the NAICS or SIC, as described in more detail hereinafter. Validation set 130 includes a set of validation summaries 132, classifications 134, and validation vectors 136 that are used to optimize the neural network used by the trainer/classifier 112, as described in more detail hereinafter. The training set 120 and the validation set 130 may be selected from a superset of training data, where a majority portion of the superset of training data is designated as the training set 120, and a minority portion of the superset of training data is designated as the validation set 130. For example, 75% of the superset of training data may be designated as the training set 120 and 25% of the superset of training data may be designated as the validation set 130. The training set 120 and the validation set 130 may be stored in any format and as organized or unorganized data, depending upon a particular implementation. For example, the training set 120 and the validation set 130 may be stored in one or more files, in a database, etc. In addition, the training set 120 and the validation set 130 may be stored within classification system 110, for example in volatile and/or non-volatile storage, or external to the classification system 110, for example in a database management system, in cloud storage, etc.

A. Summaries

Each of the summaries 122 and validation summaries 132 have a number of words, e.g., "terms," that may vary depending upon a particular implementation. For example, a summary may have between several words to ten thousand words. Longer summaries may be used at the cost of additional computational and storage resources. A summary may contain a list of subject words, e.g., keywords, that indicate aspects of the business of a business entity. Alternatively, a summary may be a prose description, e.g., written sentences, of a business entity in the form of a business summary. Summaries 122 and validation summaries 132 may be manually created and/or obtained from various sources, such as prepared materials, Websites, social media accounts, etc.

According to an embodiment, each of the summaries 122 and validation summaries 132 has a known correspondence to a particular industry classification in a hierarchical industry classification structure, such as the NAICS. The known correspondence between a summary and an industry classification may be obtained from a reliable source, such as a governmental entity. For example, suppose that a particular summary 122 describes the "ABC Sugar Manufacturing Company" and is obtained from the company's Website. A government entity may specify that the "ABC Sugar Manufacturing Company" is properly classified in the NAICS industry classification 31131, which corresponds to "Sugar Manufacturing." Thus, the classifications 124, 134 are known to be correct for the corresponding summary 122 and validation summary 132, respectively.

In FIG. 1, summaries 122 are designated as "S1" through "SN" and validation summaries 132 are designated as "VS1" through "VSM" for purposes of explanation, allowing for up to N number of summaries 122 and up to M number of validation summaries 132, and the number of summaries 122 and validation summaries 132 may vary depending upon a particular implementation.

B. Classifications

The classifications 124, 134 specify the known industry classification for a corresponding summary/validation summary. For example, a classification 124, 134 may specify a particular industry classification in a hierarchical industry classification structure, such as the NAICS. Each classification 124, 134 may be represented by a number or an alphanumeric string of any length. One non-limiting example of a classification 124, 134 is a number of two to six digits in length. In FIG. 1, classifications 124 are designated as "C1" through "CN" and classifications 134 are designated as "C1" through "CM" for purposes of explanation, meaning that there are up to N number of classifications 124 and up to M number of classifications 134, and the number of classifications 124, 134 may vary depending upon a particular implementation.

According to an embodiment, a classification 124 must have at least a threshold number of summaries to be included in the training set 120. For example, if the threshold is five, the NAICS industry classification 31131 must have at least five different summaries to be included in the training set 120. This ensures adequate representation in the training set 120 and improves accuracy. Depending upon the data used for the training set 120, using a threshold value in this manner may result in some industry classifications not being represented in the training set 120. For example, a hierarchical industry classification structure may have some obscure industry classifications for which there are relatively few business summary examples. Thus, a hierarchical industry classification structure with approximately 2200 industry classifications may have only 1500 of those industry classifications represented in the training set 120. A similar threshold may be used as a requirement for membership of validation summaries 132 in the validation set 130. In addition, a requirement may specify that a minimum number of industry classifications of a hierarchical industry classification structure should be represented in the training set 120. For example, in the context of the NAICS, a requirement may specify that the training set 120 should include summaries for at least 1500 different NAICS industry classifications.

C. Vectors

The vectors 126 include a vector representation of each summary 122 in the training set 120. Similarly, the validation vectors 136 include a vector representation of each validation summary 132 in the validation set 130. The vector representations provide a linguistic context for each summary/validation summary. According to an embodiment, a neural network is used to determine a vector space for each summary/validation summary. The vector space includes a vector for each word in the summary/validation summary, where words with similar contexts/meanings, i.e., interchangeable words, have similar vectors that are mathematically similar.

Word vectors may be determined using a variety of approaches. According to an embodiment, a shallow neural network with a single hidden layer, i.e., a linear hidden layer, is used to determine the vector space for the summaries 122. For example, Word2vec with either the Continuous Bag-Of-Words (CBOW) or the continuous skip-gram models may be used, and the models may be trained with hierarchical softmax and/or negative sampling, depending upon a particular implementation. Each vector has a specified length, e.g., 300, of real numbers.

According to an embodiment, trainer/classifier 112 implements the fastText library from Facebook's AI Research (FAIR) lab to obtain the vector representations for the words in each summary. Alternatively, pre-generated vector representations for words may be obtained from other sources, for example, from Common Crawl or social media data sources, that have generated word vectors from very large corpuses. Other approaches may be used, including determining a vector for each sub-word, e.g., sequences of characters, in the summaries 122, which may provide greater accuracy for non-English language implementations that have more flexible root words than the English language. Embodiments are described herein in the context of classifying business summaries in the English language for purposes of explanation only and embodiments are applicable to any language.

IV. Training the Neural Network

Pre-generated word vectors, even those generated based upon very large corpuses, may provide inferior accuracy when used in a very specific context, such as business summary classification. For example, generating the vectors 126 for the summaries 122 using a simple average of pre-generated word vectors may provide unsatisfactory results for classifying business summaries against a hierarchical industry classification structure because of the specific context of the summaries 122 compared to the context of a generalized corpus.

FIG. 2 is a flow diagram 200 that depicts an approach for training a word-based sub classifier using a loss function and a performance metric. According to this approach, the weight values in a hidden layer of a neural network used by a word-based sub classifier are iteratively updated to optimize a loss function. After each iteration, an $hF_1$ score is computed for a validation set and used to determine whether to stop training the word-based sub classifier. This improves the accuracy of the neural network for classifying business summaries against a hierarchical industry classification structure.

In step 202, an initial vocabulary and weight values are determined for the neural network used by the word-based sub classifier 114. The vocabulary may be obtained from pre-generated sources and based upon large corpuses that include all of the words in summaries 122. The initial weight values may be random values. Alternatively, the initial weight values may be determined based upon frequency of occurrence in the summaries 122. For example, a higher weight value may be assigned to words that have higher frequency in the summaries 122 to increase their influence on the values in the vectors 126. The word-based sub classifier 114 implements the initial weight values 310 in the hidden layer of the neural network. FIG. 3A is a block diagram that depicts data 300 used in revising the weight values in the hidden layer of the neural network used by the trainer/classifier 112. The data 300 includes initial weight values 310 that are established for the hidden layer of the neural network. In this example, the initial weight values 310, designated as Weight1 through WeightW, include a weight value for each word in the vocabulary.

In step 204, the summaries 122 in the training set 120 are processing using the word-based sub classifier 14 to obtain word vectors for each summary 122. As previously described herein, the word vectors may be obtained using a variety of methods, such as by processing the summaries 122 using a neural network, such as Word2Vec, via the fastText library from FAIR lab, and by training on pre-compiled large text corpuses, such as Common Crawl or Wikipedia.

FIG. 3A includes a summary 320, from summaries 122, that includes N number of words that are identified as Word 1, Word 2, Word 3, Word 4 through Word N. Other summaries 122 may have different numbers of words. The words may be unique, or some words may be repeated, depending upon the content of the particular summary. For example, for a summary written in prose, it is not uncommon for some of the words in the summary to be repeated. As previously described herein, each industry classification may have at least a specified number of summaries 122 to be included in the training set 120, so the summary 320 in this example may be one of several summaries 122 for a particular industry classification.

The word vectors 330 for the summary 320 include a vector for each of the words in the summary 320, where each vector is of a specified length, e.g., 300. Different parameters may be used to generate the word vectors 330 and embodiments are not limited to any particular set of parameters. For example, for Word2vec, parameters specify the model type, the sampling method, the number of iterations, dimension size, subsampling, and the window size and the particular parameters values used, e.g., window size, have a direct effect on training time and resource consumption.

In step 206, a vector representation ("vector") is determined for each summary 122. For example, the trainer/classifier 112 may determine a vector for each summary 122 based upon a weighted average of the word vectors for the words in each summary 122. At this point in the process for the initial iteration, the vectors 126 are generated for all of the summaries 122 using the initial weight values 310 for the hidden layer of the neural network used by the word-based sub classifier 114.

In step 208, the classifier model is updated. According to an embodiment, the classifier model used by the word-based sub classifier 114 is updated by adjusting the weights in the hidden layer of the neural network to minimize a loss function. This is done, for example, by comparing a probability distribution provided by the trainer/classifier 112 to the one hot encoding vectors for the summaries 122 in the training set 120. A loss function is considered to be minimized when the differences between the probability distribution values and the one-hot encoding values are minimized. According to an embodiment, cross-entropy loss is used. Other embodiments include ranking hinge loss and LambdaLoss (for a multi-label case).

One objective in adjusting the weight values in the hidden layer of the neural network is to change the influence of words in the vocabulary so that the vector for the particular validation summary is mathematically closer to the (correct) summary 122 vector for the known industry classification and mathematically further away from the summary 122 vectors for the other (incorrect) industry classifications. Stated another way, the weight values are adjusted so that the probability is greatest for the correct industry classification in the probability distribution 342, as specified by the one-hot encoding 344, while the probabilities for the other (incorrect) industry classifications are minimized. This may be accomplished, for example, using stochastic gradient descent.

In FIG. 3A, a table 340 includes an example probability distribution 342 across the N number of industry classifications 124 that correspond to the summaries 122 in the training set 120. The probability distribution 342 may be obtained, for example, from the Softmax layer of the neural network, and includes a set of normalized probability values. Each probability value represents the probability that the particular validation summary corresponds to, or is a member of, the industry classification that corresponds to the industry classification identifier in the top row of the table 340. For example, the value of 0.003 in the first column of the probability distribution 342 indicates that there is a 0.003% probability that the particular validation summary corresponds to industry classification "C1." Similarly, the value of 0.2 in the fourth column of the probability distribution 342 indicates that there is a 0.2% probability that the particular validation summary corresponds to industry classification "C4." The value of 0 in the second and third columns of the probability distribution 342 indicates that there is a 0% probability that the particular validation summary corresponds to industry classifications "C2" or "C3." The probabilities across all of the N number of industry classifications total one. Assuming that the particular validation summary is known to correspond to the industry classification "C3" in table 340, then the probability distribution 342 reveals an error because the highest probability should occur for the industry classification "C3." Ideally, the probabilities in the probability distribution 342 would include a 100% probability for industry classification "C3" and a 0% probability for all other industry classifications, which would match the one-hot encoding 344 binary vector, as described in more detail hereinafter. The presence of probabilities of greater than zero in multiple industry classifications indicates that the particular validation summary has some similarity to the other industry classifications, even though the particular validation summary is known to correspond to the industry classification "C3." Probabilities in the probability distribution 342 may be expressed in any form and on any scale, that may vary depending upon a particular implementation, and embodiments are not limited to any form or scale.

The one-hot encoding 344 is a binary vector that indicates, by a value of "1," the one industry classification that the particular validation summary is known to correspond to, i.e., the correct industry classification. All of the other entries in the one-hot encoding 344 include a value of "0" to indicate that the particular validation summary does not belong to that industry classification. The one-hot encoding 344 values are based upon the known correspondence between the particular validation summary and the industry classifications. In table 340, the third column of the first row contains a "1," indicating that the particular validation summary is known to belong to the industry classification "C3."

In step 210, an evaluation metric is computed using the validation set 130 and the current classifier model, i.e., the word-based sub classifier 114, using the current weights for the hidden layer of the neural network. According to an embodiment, the validation set 130 is used to calculate an $hF_1$ score. According to the $hF_1$ score formula, aggregation across all summaries is performed when hP (h-precision) and hR (h-recall) are computed: the sum of the cardinalities of the corresponding class subset intersections is divided by the cardinality of the parent class subset:

$$hP = \frac{\sum_i |\hat{P}_i \cap \hat{T}_i|}{\sum_i |\hat{P}_i|}, hR = \frac{\sum_i |\hat{P}_i \cap \hat{T}_i|}{\sum_i |\hat{T}_i|}, hF = \frac{2*hP*hR}{hp+hR}$$

$\hat{P}_i$ is the set consisting of the most specific class(es)

predicted for example $i$ and all its (their) ancestor classes.

$\hat{T}_i$ is the set consisting of the true most specific classes of example $i$ and all its (their) ancestor classes.

In this way, the $hF_1$ score solves the class imbalancing issue, because the parent class subset is different, therefore its cardinality normalizes the quantity for each i (summary) and the ratio does not differ much from class to class. $hF_1$ is a harmonic mean of these quantities.

In step 212, a determination is made whether the evaluation metric has been optimized. According to an embodiment, the evaluation metric is considered optimized when the $hF_1$ score can no longer be improved. If in step 212 a determination is made that the $hF_1$ score can still be improved, then in step 214, the weight values for the hidden layer of the neural network used by the word-based sub classifier 114 are adjusted. Steps 204 through 214 are repeated, each time using the current version of the word-based sub classifier 114 trained on the training set 120, until a determination is made in step 212 that the $hF_1$ score can no longer be improved using, for example, one or more early stopping criteria. The process is then complete in step 216.

The aforementioned approach optimizes the weights used by the hidden layer of the neural network used by the word-based sub classifier to provide more accurate classifications of business summaries against a hierarchical industry classification structure.

V. Special Considerations for Underrepresented Parent Industry Classifications In some situations, a particular parent industry classification in a hierarchical industry classification structure may be underrepresented in the training set 120. For example, a particular parent industry classification may have far fewer summaries 122 in the training set 120 compared to other industry classifications represented in the training set 120. As another example, the particular parent industry classification may have no summaries 122 in the training set 120. As used herein, the term "parent industry classification" refers to an industry classification in a hierarchical industry classification structure that has at least one direct child industry classification, i.e., an industry classification that is more specific than the parent industry classification.

FIG. 3B is a block diagram that depicts a hierarchical industry classification structure 360 that includes a parent industry classification and two child industry classifications. In practice the hierarchical industry classification structure 360 may have may more industry classifications and more levels, but these are omitted in FIG. 3B for purposes of discussion. In the example depicted in FIG. 3B, the three depicted industry classifications are from the NAICS and include a parent industry classification 31131 for sugar manufacturing, also referred to industry classification "C1," and two child industry classifications 311313 for beet sugar manufacturing "C2" and 311314 for cane sugar manufacturing "C3." It presumed, for purposes of this example, that parent industry classification C1 is underrepresented in the training set 120. Underrepresentation may be established using a threshold number of summaries 122 in the training set 120. For example, a parent industry classification having fewer than a specified number of summaries 122 in the training set 120 is considered to be underrepresented in the training set 120.

According to an embodiment, an approach is provided for increasing the representation of underrepresented (or unrepresented) parent industry classifications in the training set 120 using child industry classifications. During the process of updating the weight values for the hidden layer of the neural network, a determination is made whether the correct industry classification for the validation summary is a child industry classification of an underrepresented parent industry classification. If so, then the one-hot encoding vector for the validation summary is modified to include a synthetic value for the underrepresented parent industry classification so that when the weight values are adjusted, the representation of the parent industry classification in the training set will be increased.

FIG. 4 is a flow diagram 400 that depicts an approach for increasing the representation of underrepresented parent industry classifications according to an embodiment. In step 402, during the process of revising the weight values in the hidden layer of the neural network used by the word-based sub classifier 114, a determination is made whether the correct industry classification for the validation summary has an underrepresented (or unrepresented) parent industry classification. In this example, it is presumed that the correct industry classification for the validation summary 132 being tested is industry classification C3 in FIG. 3B. Data that specifies the structure of the hierarchical industry classification structure 360 is examined to determine that industry classification C3 has a parent industry classification C1. The parent industry classification C1 may be tested to determine whether it is underrepresented, as previously described, or the data that specifies the structure of the hierarchical industry classification structure 360 may indicate that parent industry classification C1 is underrepresented. If, in step 402, a determination is made that the correct industry classification for the validation summary does not have an underrepresented parent industry classification, then control continues to step 406 and the weight values are adjusted for the hidden layer of the neural network, as previously described herein.

If, in step 402, a determination is made that the correct industry classification for the validation summary does have an underrepresented parent industry classification, then in step 404, the one-hot encoding vector for the validation summary is updated to include a synthetic value for the underrepresented parent industry classification. For example, FIG. 3B depicts a table 370 that includes an example probability distribution 372 for the validation summary being tested across the N number of industry classifications represented in the training set 120. In this example, the one-hot encoding 374 binary vector indicates that the validation summary is known to correspond to industry classification C3. This is indicated by the value of "1" for the C3 industry classification in the first row of the table 370.

FIG. 3C depicts the table 370 after a synthetic value for the underrepresented parent industry classification has been added to the one-hot encoding 374 binary vector for the validation summary. Thus, FIG. 3C depicts a modified one-hot encoding of the true class distribution, incorporating relationships between a child industry code and its immediate parent in the hierarchy. Given that the underrepresented parent industry classification is C1, a synthetic value 376 is added to the one-hot encoding vector for industry classification C1 in the first row of table 370. Including the synthetic value 376 for the underrepresented parent industry classification in the one-hot encoding binary vector for the validation summary increases the probability for the underrepresented parent industry classification when a business summary is classified. More specifically, the synthetic value 376 added to the one-hot encoding vector will be considered when the weight values in the hidden layer of the neural network are updated to minimize the loss function. This increases representation of the parent industry classification in the vectors 126 for the training set 120. This approach essentially shares information across classification codes in a hierarchical industry classification structure and has been found to improve accuracy because of the inherent textual similarities between parent and child classification codes. According to an embodiment, a normalized value of less than one is used for the synthetic value 376 so that the probability for the correct child industry classification will be higher than the probability for the parent industry classification. This preserves the accuracy of predictions for child industry classifications, while including the correct, but more general, parent industry classification.

Control then continues to step 406 and the weight values in the hidden layer of the neural network are updated as previously described herein.

VI. Performance Evaluation

Conventional metrics for measuring the accuracy of classification systems suffer from several limitations. Assuming that a classification system has been proven to be robust, inaccuracies can result from imbalanced industry classifications, i.e., where not all of the industry classifications are balanced equally. For example, the F1 score, which is a harmonic average of the precision and recall, provides a more balanced view compared to other metrics, such as sensitivity and specificity. Another problem is that some metrics favor the most heavily represented industry classifications over less represented industry classifications. Yet another problem with conventional metrics is that they treat all of the industry classifications in a hierarchical classification structure the same and do not consider hierarchical information, and therefore do not differentiate between different kinds of misclassifications.

According to an embodiment, the $hF_1$ score is used as an evaluation metric to evaluate the performance of the classification system 110. The $hF_1$ score is described in "Learning and Evaluation in the Presence of Class Hierarchies: Application to Text Categorization," by Svetlana Kiritchenko et al., the contents of which are incorporated herein by reference in their entirety as if fully set forth herein, and for all purposes. The $hF_1$ score provides credit to partially correct classifications. A partially correct industry classification is one in which the incorrect industry classification is on the same subgraph as the correct industry classification, i.e., the incorrect industry classification and the correct industry classification share the same parent industry classification. As previously described herein, the correct and incorrect industry classifications may be determined from the one-hot encoding vector for the validation summary. An alternative metric to the $hF_1$ score that exploits the notion of distance in the hierarchy is the hierarchical error rate: error rate=1−accuracy. The cost (weight) of one misclassification, d(c_ij, C_i), is defined as the height (number of edges in a tree) of the lowest common ancestor of c_ij and C_i in the hierarchy. H-error rate=mean of weights on errors. This metric is utilized in the well-known ImageNet competition. An important difference between the h-error rate and the $hF_1$ score is that the h-error rate penalizes equally too high predictions (e.g., '541' instead of true '54111' NAICS) and too low predictions ('54111' instead of '541') if they are symmetric: the h-error rate is 2 in both cases. In contrast, the hF1 score offers flexibility in weighing these types of errors through different weights of hP and hR. For example, in the first case, hP=1 and hR=0.5, while in the second case, hP=0.5 and hR=1. When combined into $hF_\beta$, beta may be set to 2 to favor recall (hR) over precision (hP):

$$hF_\beta = (1 + \beta^2)\frac{hP \cdot hR}{\beta^2 \cdot hP + hR}$$

According to an embodiment, misclassifications to sibling or parent industry classification are penalized less than misclassifications to distant industry classifications, i.e., industry classifications that are not the parent industry classification and do not share the same parent industry classification as the correct industry classification. Referring to FIG. 3B, suppose that the industry classification C4 corresponds to an industry classification that is a child of a different parent industry classification than C1. When the weight values for the hidden layer of the neural network are adjusted, the misclassification of the validation summary to industry classification C4 is penalized more heavily than the misclassification to industry classification C1 because the distance from industry classification C4 to the correct classification C3 is greater than the distance from industry classification C1 to the correct industry classification C3. In addition, credit may be given to partially correct industry classifications. In the prior example, a probability for C2 is considered to be partially correct, since industry classifications C2 and C3 are on the same subgraph, i.e., share the same parent industry classification C1. Providing a credit for partially correct industry classifications and penalizing incorrect industry classifications based upon distance may be used separately or in combination, depending upon a particular implementation.

VII. Using the Classification System to Classify Business Summaries

FIG. 5 is a flow diagram 500 that depicts an approach for classifying text-based descriptions of business entities against a hierarchical industry classification structure. The example depicted in FIG. 5 is described in the context of the NAICS for purposes of explanation, but the approach is applicable to any hierarchical industry classification structure or system.

In step 502, request is received to classify a business summary against a hierarchical industry classification structure. For example, trainer/classifier 112 may receive a request from client device 150 to classify a business summary 152 against the NAICS. The request may conform to an application program interface supported by trainer/classifier 112.

In step 504, a mathematical representation, in the form of a vector, is determined for the business summary. For example, the trainer/classifier 112 may process the business summary using the neural network to obtain a vector for each word in the business summary. The trainer/classifier 112 then determines an average weighted vector for the business summary, based upon the vector for each word in the business summary.

In step 506, an output probability distribution over industry classifications for the business summary vector is calculated using the word-based sub classifier. For example, a probability distribution across the 1500 represented industry classifications of the NAICS is provided by the word-based sub classifier 114, where the sum of the probabilities is 1.0.

In step 508, an output probability distribution over the industry classifications for the business summary vector is calculated using the category-based sub classifier. For example, a probability distribution across the 1500 represented industry classifications of the NAICS is provided by the category-based sub classifier 116, where the sum of the probabilities is 1.0.

In step 510, the meta classifier 118 generates a predicted probability distribution over industry classifications for the business summary vector based upon the output probability distributions generated by the word-based sub classifier 114 and the category-based sub classifier 116. For example, the meta classifier 118 generates a probability distribution that is the geometric mean of the probability distribution generated by the word-based sub classifier 114 and the probability distribution generated by the category-based sub classifier 116.

In step 512, the N number of industry classifications with the highest probabilities are provided as predicted classifications for the business summary. Alternatively, a probability threshold may be used to filter out industry classifications with low confidence. In some situations, none of the industry classifications may have a probability greater than the probability threshold, indicating that the industry classification for the business summary is uncertain.

According to an embodiment, the best-matching summaries have the highest probabilities and they may be selected using a specified threshold. For example, the summaries having a probability greater than the specified threshold are selected as the best-matching summaries. Alternatively, the N number of summaries with the highest probabilities are selected as the best-matching summaries. According to an embodiment, the summary with the highest probability is designated as the matching summary and the industry classification for the summary is assigned to the business summary.

VIII. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
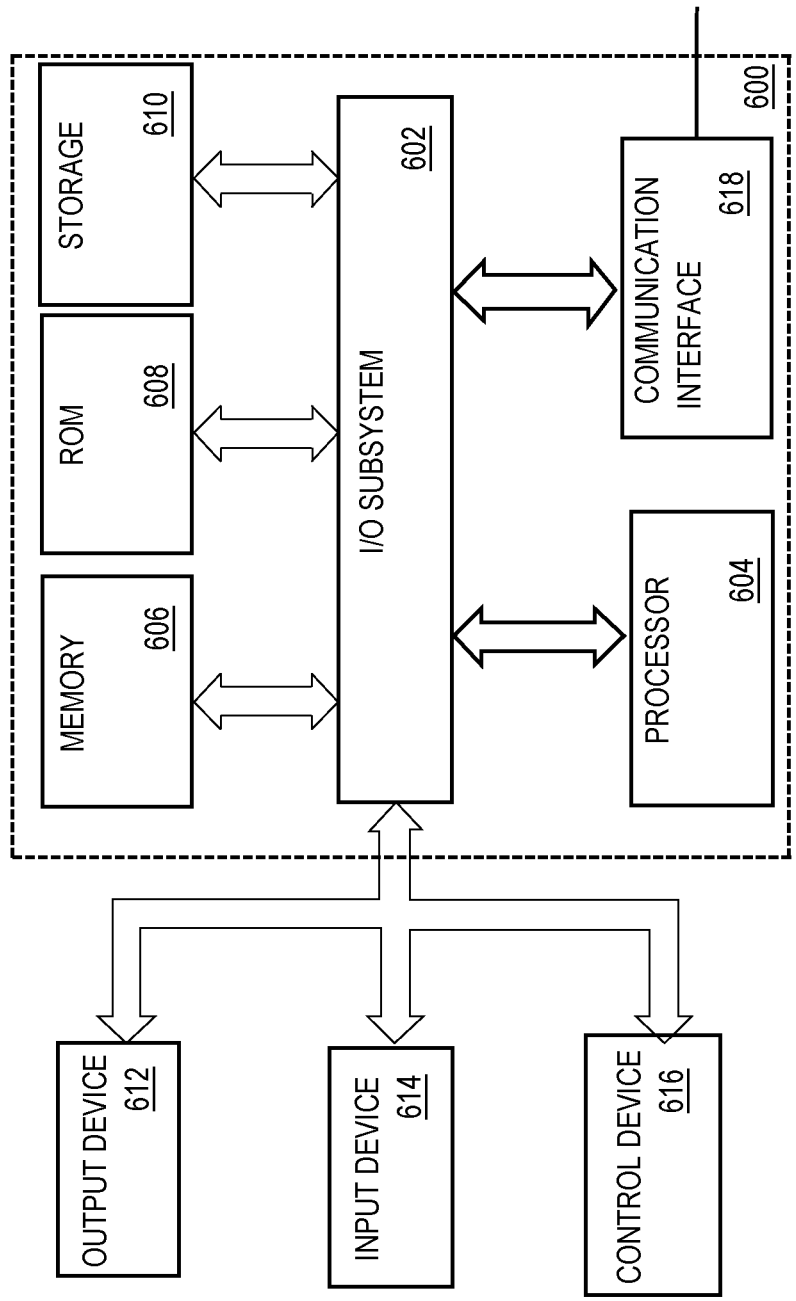
FIG. 6 is a block diagram that depicts an example computer system upon which embodiments may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A computing apparatus comprising:
   one or more processors;
   one or more memories; and
   a word-based sub classifier configured to generate a first probability distribution for a text-based business summary across a plurality of industry classifications in a hierarchical industry classification structure, wherein:
      the word-based sub classifier is trained on a training set comprising a plurality of text-based business summaries, wherein each text-based business summary, from the plurality of text-based business summaries, has a known correspondence to an industry classification, from the plurality of industry classifications, in the hierarchical industry classification structure, and
      training of the word-based sub classifier is completed when an evaluation metric satisfies one or more early stopping criteria,
   a category-based sub classifier configured to generate a second probability distribution for the text-based business summary across the plurality of industry classifications in the hierarchical industry classification structure,
   a meta classifier configured to determine a predicted probability distribution for the text-based business summary across the plurality of industry classifications in the hierarchical industry classification structure based upon the first probability distribution generated by the word-based sub classifier and second probability distribution generated by the category-based sub classifier.

2. The computing apparatus as recited in claim 1, wherein the word-based sub classifier is further configured to use a neural network to determine a vector representation for a particular text-based business summary from the plurality of text-based business summaries by:
   determining a vector representation for each word in the particular text-based business summary, and
   determining an average vector representation based upon the vector representations for each word in the particular text-based business summary.

3. The computing apparatus as recited in claim 1, wherein training the word-based sub classifier includes updating weight values in a hidden layer of a neural network used by the word-based sub classifier to minimize a loss function, where a loss in the loss function represents a difference between an estimated probability and a known probability that a particular text-based business summary, from the plurality of text-based business summaries in the training set, corresponds to a particular industry classification in the hierarchical industry classification structure.

4. The computing apparatus as recited in claim 3, wherein updating weight values in a hidden layer of a neural network used by the word-based sub classifier to minimize a loss function includes, for a particular industry classification in the hierarchical industry classification, increasing representation of a parent industry classification to the particular industry classification in the hierarchical industry classification.

5. The computing apparatus as recited in claim 4, wherein the word-based sub classifier is further configured to revise a value that corresponds to the parent industry classification in a one-hot vector representation for the particular text-based validation summary.

6. The computing apparatus as recited in claim 1, wherein:
   the evaluation metric is an $hF_1$ score calculated based upon results of processing a set of validation summaries using the word-based sub classifier.

7. The computing apparatus as recited in claim 1, wherein the predicted probability distribution for the text-based business summary across the plurality of industry classifications in the hierarchical industry classification structure is a geometric mean of the first probability distribution generated by the word-based sub classifier and the second probability distribution generated by the category-based sub classifier.

8. One or more non-transitory computer-readable media storing instructions which, when processed by one or more processors, cause:
   a word-based sub classifier to generate a first probability distribution for a text-based business summary across a plurality of industry classifications in a hierarchical industry classification structure, wherein:
      the word-based sub classifier is trained on a training set comprising a plurality of text-based business summaries, wherein each text-based business summary, from the plurality of text-based business summaries, has a known correspondence to an industry classification, from the plurality of industry classifications, in the hierarchical industry classification structure, and training of the word-based sub classifier is completed when an evaluation metric satisfies one or more early stopping criteria,
a category-based sub classifier to generate a second probability distribution for the text-based business summary across the plurality of industry classifications in the hierarchical industry classification structure,
a meta classifier to determine a predicted probability distribution for the text-based business summary across the plurality of industry classifications in the hierarchical industry classification structure based upon the first probability distribution generated by the word-based sub classifier and second probability distribution generated by the category-based sub classifier.

9. The one or more non-transitory computer-readable media as recited in claim 8, further comprising additional instructions which, when processed by the one or more processors, cause the word-based sub classifier to use a neural network to determine a vector representation for a particular text-based business summary from the plurality of text-based business summaries by:
determining a vector representation for each word in the particular text-based business summary, and
determining an average vector representation based upon the vector representations for each word in the particular text-based business summary.

10. The one or more non-transitory computer-readable media as recited in claim 8, wherein training the word-based sub classifier includes updating weight values in a hidden layer of a neural network used by the word-based sub classifier to minimize a loss function, where a loss in the loss function represents a difference between an estimated probability and a known probability that a particular text-based business summary, from the plurality of text-based business summaries in the training set, corresponds to a particular industry classification in the hierarchical industry classification structure.

11. The one or more non-transitory computer-readable media as recited in claim 10, wherein updating weight values in a hidden layer of a neural network used by the word-based sub classifier to minimize a loss function includes, for a particular industry classification in the hierarchical industry classification, increasing representation of a parent industry classification to the particular industry classification in the hierarchical industry classification.

12. The one or more non-transitory computer-readable media as recited in claim 11, further comprising additional instructions which, when processed by the one or more processors, cause the word-based sub classifier to revise a value that corresponds to the parent industry classification in a one-hot vector representation for the particular text-based validation summary.

13. The one or more non-transitory computer-readable media as recited in claim 8, wherein:
the evaluation metric is an $hF_1$ score calculated based upon results of processing a set of validation summaries using the word-based sub classifier.

14. The one or more non-transitory computer-readable media as recited in claim 8, wherein the predicted probability distribution for the text-based business summary across the plurality of industry classifications in the hierarchical industry classification structure is a geometric mean of the first probability distribution generated by the word-based sub classifier and the second probability distribution generated by the category-based sub classifier.

15. A computer-implemented method comprising:
a word-based sub classifier generating a first probability distribution for a text-based business summary across a plurality of industry classifications in a hierarchical industry classification structure, wherein:
the word-based sub classifier is trained on a training set comprising a plurality of text-based business summaries, wherein each text-based business summary, from the plurality of text-based business summaries, has a known correspondence to an industry classification, from the plurality of industry classifications, in the hierarchical industry classification structure, and
training of the word-based sub classifier is completed when an evaluation metric satisfies one or more early stopping criteria,
a category-based sub classifier generating a second probability distribution for the text-based business summary across the plurality of industry classifications in the hierarchical industry classification structure,
a meta classifier determining a predicted probability distribution for the text-based business summary across the plurality of industry classifications in the hierarchical industry classification structure based upon the first probability distribution generated by the word-based sub classifier and second probability distribution generated by the category-based sub classifier.

16. The computer-implemented method as recited in claim 15, further comprising the word-based sub classifier using a neural network to determine a vector representation for a particular text-based business summary from the plurality of text-based business summaries by:
determining a vector representation for each word in the particular text-based business summary, and
determining an average vector representation based upon the vector representations for each word in the particular text-based business summary.

17. The computer-implemented method as recited in claim 15, wherein training the word-based sub classifier includes updating weight values in a hidden layer of a neural network used by the word-based sub classifier to minimize a loss function, where a loss in the loss function represents a difference between an estimated probability and a known probability that a particular text-based business summary, from the plurality of text-based business summaries in the training set, corresponds to a particular industry classification in the hierarchical industry classification structure.

18. The computer-implemented method as recited in claim 17, wherein updating weight values in a hidden layer of a neural network used by the word-based sub classifier to minimize a loss function includes, for a particular industry classification in the hierarchical industry classification, increasing representation of a parent industry classification to the particular industry classification in the hierarchical industry classification.

19. The computer-implemented method as recited in claim 18, further comprising the word-based sub classifier revising a value that corresponds to the parent industry classification in a one-hot vector representation for the particular text-based validation summary.

20. The computer-implemented method as recited in claim 15, wherein:
the evaluation metric is an $hF_1$ score calculated based upon results of processing a set of validation summaries using the word-based sub classifier.

21. The computer-implemented method as recited in claim 15, wherein the predicted probability distribution for the text-based business summary across the plurality of industry classifications in the hierarchical industry classification structure is a geometric mean of the first probability distribution generated by the word-based sub classifier and the second probability distribution generated by the category-based sub classifier.

\* \* \* \* \*